Figure 1:
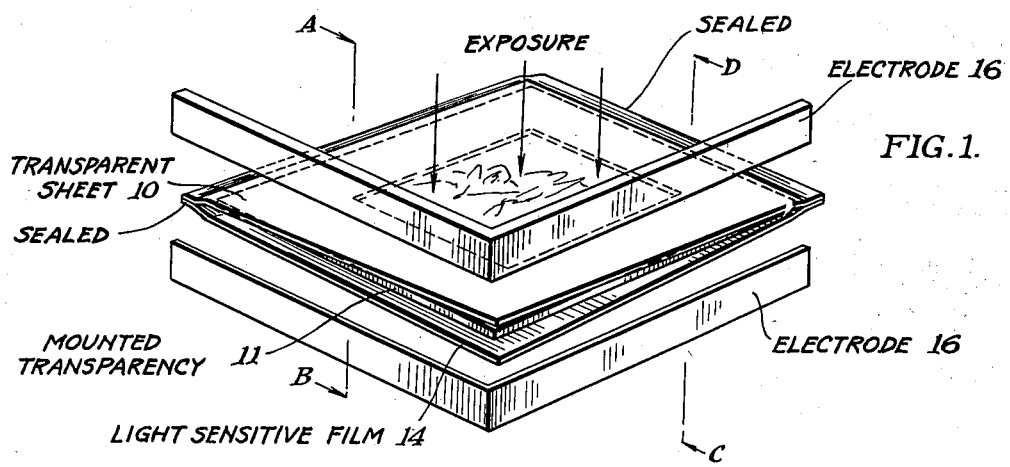

May 13, 1952  J. W. GOSLING ET AL  2,596,677
METHOD FOR MAKING MASKS FOR PHOTOGRAPHIC TRANSPARENCIES
Filed Dec. 6, 1947  2 SHEETS—SHEET 1

JOHN W. GOSLING
CHARLES S. COMBS
INVENTOR

BY
ATTORNEY & AGENT

May 13, 1952 J. W. GOSLING ET AL 2,596,677
METHOD FOR MAKING MASKS FOR PHOTOGRAPHIC TRANSPARENCIES
Filed Dec. 6, 1947 2 SHEETS—SHEET 2

JOHN W. GOSLING
CHARLES S COMBS
INVENTORS
BY
ATTORNEY & AGENT

Patented May 13, 1952

2,596,677

UNITED STATES PATENT OFFICE 2,596,677

METHOD FOR MAKING MASKS FOR PHOTOGRAPHIC TRANSPARENCIES

John W. Gosling and Charles S. Combs, Rochester, N. Y., assignors to Eastman Kodak Company, Rochester, N. Y., a corporation of New Jersey Application December 6, 1947, Serial No. 790,182

13 Claims. (Cl. 95—2)

This invention relates to photography and more particularly to a process of making masks of use in correcting photographic transparencies.

It is well known in the art of photography that when it is desired to obtain reproductions of images on transparent supports it is customary to merely print through the image on to a suitable light-sensitive photographic element and thus a positive image is obtained from a negative transparency. Occasionally it is found that the resultant image lacks the desired photographic quality—that is, the contrast, tone, etc. of the print is different or undesirable as compared to the original subject. In case the print was made from a color transparency on to a similar color film, a large number of defects may be apparent in the resultant print, such as incorrect saturation of certain colors, too high or too low contrast, or poor tone reproduction. A common method for correcting such errors in reproductions includes making a masking image, generally a thin low-contrast negative if one is printing from a positive color transparency on to a reversal color film, and printing from the combination of the transparency plus the mask on to the desired printing material. Naturally this process entails the steps of exposing the masking film through the transparency, processing the masking film, and again registering the resultant mask with the transparency and then printing the final reproduction from the masked transparency. When one is making a mask for a mounted color transparency such as a 35 mm. transparency mounted in cardboard, glass, plastic, metal or other material, for a number of reasons it is not desirable to remove the picture from the mount and by ordinary means it has been singularly difficult to make a satisfactory mask without doing so.

We have found that the process of making a mask for a color transparency whether in the mount or not, and a print therefrom, can be greatly simplified and better quality assured, if the mask is not separated from the transparency during the entire process of printing the mask, processing it and printing the final print.

One object of our invention is to provide a process of making and using a photographic mask for a transparency, particularly a mounted transparency, in which the mask remains integral with the transparency throughout all exposure and processing steps. Another object is to provide materials and apparatus suitable for making and using a mask integral with a photographic transparency. Another object is to provide a sensitive photographic element composed of two plastic sheets sealed along at least one common edge and having a light-sensitive layer on an outer surface. Another object is to provide a plastic packet having a photographic transparency enclosed in it and a light-sensitive layer or a masking image on the outer surface. Other objects of our invention will become apparent from the following description.

In general, the objects of our invention are accomplished by sealing a photographic transparency between one transparent sheet and a second transparent sheet carrying a light-sensitive emulsion layer so as to leave the emulsion layer outermost and then forming a masking image in the emulsion layer and finally printing a corrected image without unsealing the envelope. According to a preferred embodiment of our invention, the sealing is effected by means of high-frequency heating.

Figure 2:
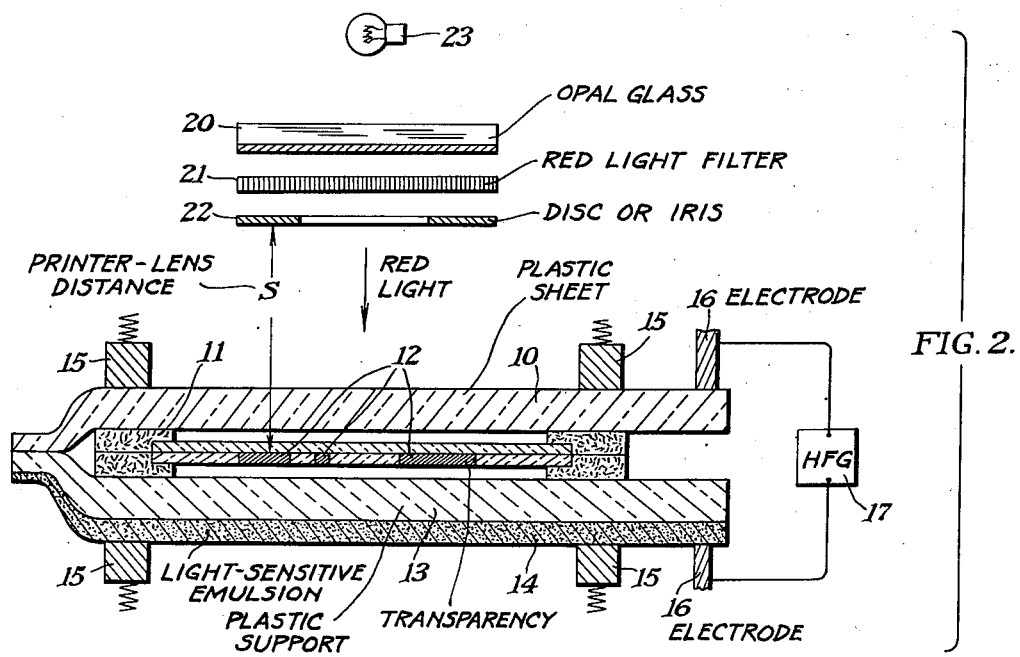
Figure 3:
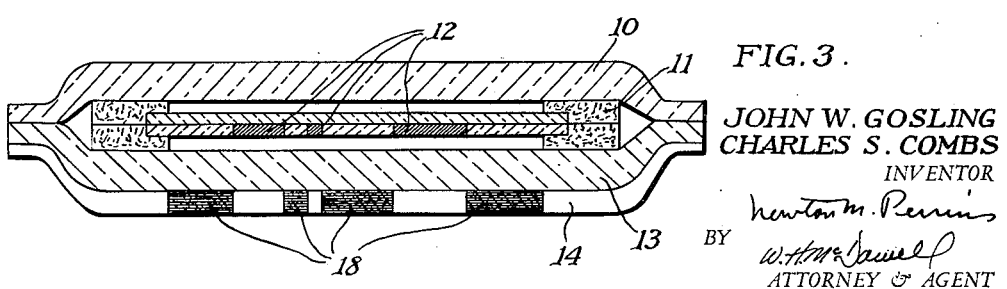
Figure 4:
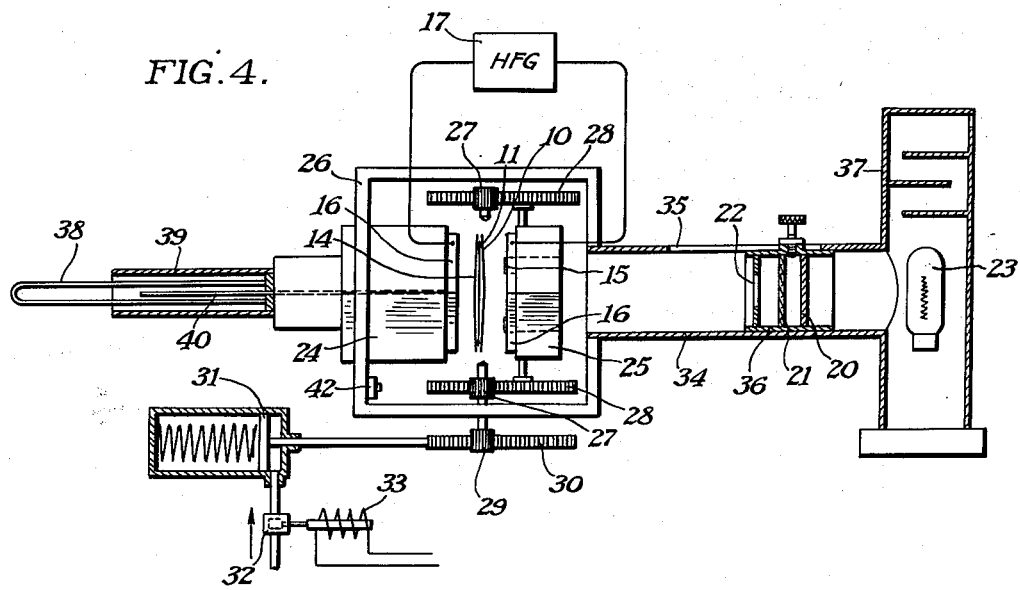
Figure 5:
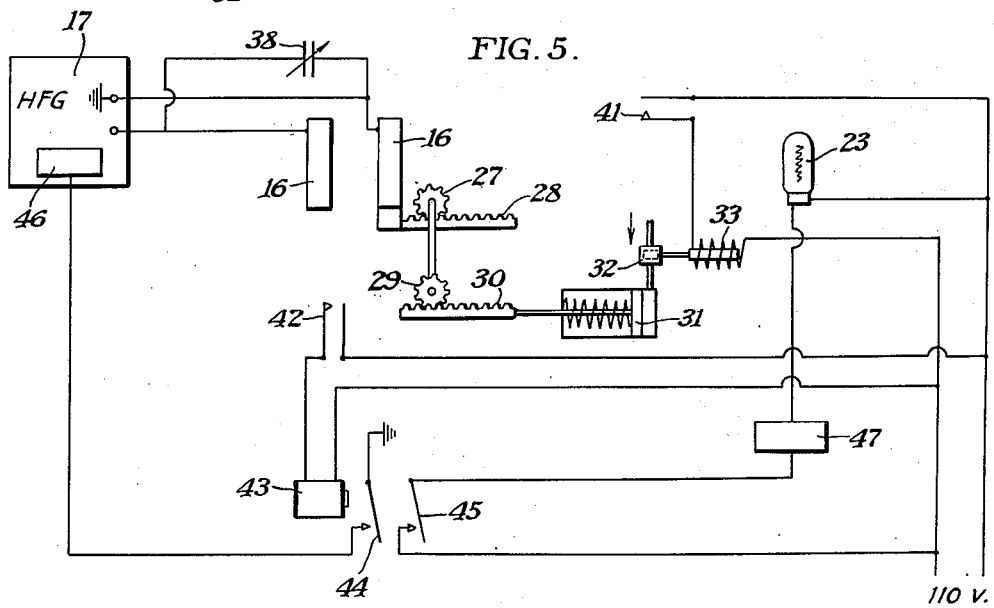

In the accompanying drawings is shown diagrammatically and schematically one method of carrying out our invention according to which Fig. 1 illustrates the method and materials used when heating is used for the sealing operation. Fig. 2 shows the appearance of a partially-sealed element preparatory to exposure and sealing by high-frequency heating. Fig. 3 shows the relative position of the parts of the envelope after exposure, processing and sealing by means of high-frequency heating. Fig. 4 shows the apparatus for high-frequency heat-sealing the envelope and exposing the mask during the heat-sealing operation. Fig. 5 is a schematic diagram showing the principal elements of the electrical circuit controlling the sealing and exposing steps of the invention.

According to the simplest form of our invention, we take a transparency, either a black-and-white or a color transparency, and seal it between a transparent sheet and a second transparent sheet carrying a light-sensitive emulsion layer on its outermost surface where it is available to processing solutions. We prefer that the unsensitized sheet be of glass or a fairly rigid plastic material, such as a cellulose ester, and the sheet carrying the sensitive emulsion layer is a cellulose ester or similar clear film-base material. Both sheets are highly resistant to moisture. Sealing of the transparency between the two sheets is effected by placing the transparency on the unsensitized sheet and applying cement to the unsensitized sheet along the borders of the transparency. Following this, the light-sensitive film is placed base down over the transparency and held in contact with the cement until a firm bond is obtained. Thereafter we expose the emulsion layer through the transparency for a suitable length of time, if desirable interposing a light filter or other light modulating element in the exposing beam, and then without unsealing the envelope we subject it to development, fixing, washing and drying operations. As a result, a mask is obtained on the outer surface of the envelope in registry with the original transparency, and corrected prints are then made by exposing through the masked transparency in the usual manner. The selection of the sealing cement depends upon the composition of the particular transparent sheets used; for example, if the sensitized sheet has a cellulose acetate base and the other sheet is glass, it is usually best to first coat the glass with a subbing layer of a cellulose ester such as cellulose acetate and use a solvent such as acetone or an acetone dope of cellulose acetate for the cement. Synthetic resin cements and subcoatings may also be used. If desired, the cement can be applied over the whole transparency but this is less desirable because of the difficulty of unsealing the envelope at a later time and returning the original transparency to the customer in its original condition, particularly if a cardboard mounted transparency has been thus treated.

According to the preferred embodiment of our invention we dry-seal the transparency between transparent plastic sheets without the use of cement. As before, one of the sheets carries a light-sensitive emulsion layer such as a silver halide emulsion on the outer surface of the envelope and all exposure and processing steps involved in making the mask and printing a reproduction therefrom are carried out without removal of the transparency from the envelope. Several methods are now available for effecting the dry-seal. We may apply pressure alone by suitable means to the marginal area of the unsealed edges extending beyond the borders of the transparency and thus cause the edges of the sheets to adhere to each other. However, we prefer to use heat and especially high-frequency heating as the principal means for causing the edges to become sealed.

The preferred embodiment of our invention will now be described with reference to the accompanying drawings.

As shown in Fig. 1 diagrammatically, the transparency 11 mounted or not in cardboard or the like, is placed between a transparent plastic sheet 10 of, for example, cellulose acetate, and a light-sensitive film 14, which has been cut a little larger, approximately 1/8-inch larger, than the transparency and have previously been sealed along two edges to facilitate positioning of the transparency in the partially-sealed envelope. The L-shaped electrodes 16 or heaters, if sealing is by heat means other than high frequency, are arranged opposite each other and extend along the marginal area of the unsealed edges of the sheets as shown. When electrodes 16 are supplied with high-frequency current and pressed against the unsealed edges of sheet 10 and film 14, the heat seal is effected. The process is represented diagrammatically in Fig. 2 wherein an enlarged cross-sectional view taken at plane ABCD of Fig. 1 shows the transparency 11 containing images 12 positioned between plastic sheet 10 and the plastic support 13 carrying the light-sensitive emulsion 14 outermost. The spring-pressure members 15 hold the transparency in position during sealing of the edges of the envelope with the electrodes 16 connected to the high-frequency generator 17, or other electrical heating means, as shown. We have discovered that it is possible at approximately the same time that the transparency is being sealed in the envelope, to expose the sensitive emulsion 14 through the transparency 11 with light from source 23 as shown in Fig. 2. However, it is desirable that there be interposed in the light beam light-modulating elements such as opal glass 20, a light filter 21 and a disk, iris, or annular ring 22 to produce a filtered extended light source. The filter 21 is of particular use when the transparency 11 is a color transparency and the mask is to be exposed by light of a selected wave-length. Also the element 22 should be spaced at a distance S from the images 12 such that this distance is the same as the printer-lens distance will be when the final print is made by exposure to the masked transparency. In this respect distance S together with the diameter of the aperture of element 22 controls diffusion. Opal glass 20 provides a diffuse light source and its distance from the images 12 controls the over-all size of the mask relative to the transparency. When transparency 11 is a color transparency and the mask desired is to function as a relative brightness correction mask, emulsion layer 14 may be blue and red-sensitive and filter 21 is a filter principally transmitting light of the wave lengths beyond 550 milli-microns. If lamp 23 is a 100-watt tungsten bulb operating at 115 volts and a distance of about 12 inches and the disk 22 has an aperture of about one-half inch, the exposure is approximately one second. The resulting exposure forms latent images in the layer 14 in proportion to the transmission of light through the various images 12. According to one unique feature of our process, somewhat before or simultaneously with the time the exposure is being made, the pressure members 15 and electrodes or heaters 16 may be caused to press the unsealed edges of the envelope together and effect sealing thereof. There is now obtained a waterproof packet containing the transparency and having a latent masking image in emulsion layer 14. We then prefer to pre-harden the emulsion before development by immersion of the whole packet in a solution of the following composition:

| | |
|---|---:|
| Formaldehyde (40%) cc | 25 |
| Sodium carbonate (dry) grams | 20 |
| Potassium bromide do | 2.5 |
| Sodium sulfate do | 50 |
| Water to make liter | 1 |

After washing the packet we then develop the masking image by immersion of the whole packet in a suitable black-and-white or color developer, depending on whether a black-and-white or colored mask is required. A suitable black-and-white developer in which development may be carried out for about 6 minutes is one having the following composition:

| | |
|---|---:|
| Sodium sulfite grams | 12.0 |
| p-Methylamino-phenol sulfate do | 1.0 |
| Hydroquinone do | 1.0 |
| Potassium bromide do | 0.2 |
| Sodium metaphosphate do | 4.0 |
| Benzotriazole do | 0.4 |
| Water to make liter | 1.0 |

Development is carried out at about 72° F. until the mask has the desired sensitometric characteristics and then the whole packet is immersed in a fixing bath of the following composition for about four minutes:

| | | |
|---|---|---|
| Water (about 125° F.) (50° C.)_____cc__ | 600 |
| Sodium thiosulfate (Hypo)_____grams__ | 240.0 |
| Sodium sulfite, desiccated_____do __ | 15.0 |
| Acetic acid, (28% pure)_____cc__ | 48.0 |
| Boric acid, crystals_____grams__ | 7.5 |
| Potassium alum_____do __ | 15.0 |
| Cold water to make_____liter__ | 1.0 |

The packet is then washed for about five minutes and dried for about 20 minutes at 130° F. The packet now appears as shown in enlarged cross-sectional view in Fig. 3 of the drawings, in which the edges of layers 10, 13 and 14 are sealed together completely enclosing transparency 11, and layer 14 contains the silver masking images 18 and clear colloid in the remaining area of the layer.

In order to obtain corrected prints from the masked transparency of Fig. 3 we then print through the packet in the usual manner on to a suitable printing material such as a black-and-white printing paper if the original transparency was a black-and-white negative, or on to a multilayer color film if the transparency was a color transparency. After obtaining the desired print the packet may be opened and the transparency is available in its original condition.

Our process is adaptable to producing masks for color films serving a wide variety of purposes, The emulsion layer 14, filter 21 and transparency 11 may be selected, and the masking image produced and used in the manner described for example in U. S. Patent 2,378,213, Glasoe, granted June 12, 1945; U. S. Patent 2,294,981, Hanson, Jr., granted September 8, 1942; U. S. Patent 2,384,665, Williams et al., granted September 11, 1945; U. S. Patent 2,376,132, Evans, granted May 15, 1945, and U. S. Patent 2,405,739, Evans et al., granted August 13, 1946.

It is apparent that in certain instances it is not necessary to remove the transparency from the envelope, since the masking image may be exposed and developed so as to improve the quality of the transparency when we viewed in an illuminator or projected on a screen.

In Fig. 4 is shown diagrammatically the apparatus which may be used for sealing the packet by means of high-frequency heating and exposing the masking emulsion layer during the sealing operation. In Fig. 4 the packet not sealed on two edges and consisting of transparent sheet 10, sensitive film 14 and transparency 11, is held in sealing position by an L-shaped holder not shown, between electrodes 16 which are in an inoperative position to permit introduction of the packet. Electrodes 16 are affixed to the non-conducting mounts 24 and 25, mount 24 being attached to frame 26 and mount 25 is attached, opposite and movably toward and from mount 24, to racks 28, which are operated by pinion gears 27 and 29 through rack 30 connected to piston 31 which is supplied with air from valve 32 operated by solenoid 33. The four spring pressure members 15 are carried by mount 25 and are arranged parallel to the edges of the packet, the two spring pressure members 15 which are parallel to the unsealed edges of the packet and positioned close to the electrodes, are preferably of non-conducting material such as a synthetic resin so as not to interfere with the high-frequency field supplied to the electrodes by the high-frequency generator 17. Tube 34 attached to frame 26 has a slot 35 to allow adjustment of the distance of carriage 36 from the exposure plane between the electrodes. Carriage 36 contains opal glass 20, filter 21 and disk 22. Light source 23 in baffled chamber 37 is positioned in optical alignment with the apertures through disk 22 and mount 25. Tuning stub 38 is movable in metal tube 39 for tuning purposes and makes a sliding contact with tube 39 and rod 40 which extends through mount 24 and contacts the left hand electrode.

In typical operation the unsealed packet is inserted between the electrodes while they are in an inoperative position and the lamp, solenoid and generator circuits are open as shown in Fig. 5. When micro switch 41 is depressed it actuates solenoid 33 and air valve 32 admitting air to the piston chamber to move piston 31 and cause the electrodes to come together by means of the racks and gears connected to the piston. Before the piston stroke is complete the end of rack 31 depresses switch 42 located on frame 26 as shown in Fig. 4, which actuates relay 43 and closes switches 44 and 45. Switch 44 closes the generator circuit and starts timer 46, and switch 45 turns on lamp 23 and starts exposure timer 47. After the given exposure interval timer 47 opens the lamp circuit and when the sealing interval is over timer 46 breaks the generator circuit and causes solenoid 33 to close air valve 32 and the removal of air pressure from piston 31 allows the spring in the piston chamber to return the electrode to the inoperative position. It is apparent that if it is desired to terminate exposure before the sealing cycle is complete this can be accomplished by releasing micro switch 41 which opens switch 45 but switch 44 is opened only by timer 46.

Our process is subject to a number of variations. As mentioned, practically any transparent sheet material may be used for sheet 10 of Fig. 2 such as glass, cellulose ester or a synthetic resin, and sensitized support 13 is preferably a flexible transparent sheet of a cellulose ester or synthetic resin. However, when sealing is effected by means of heat, particularly by means of high-frequency heating as described, the sheet 10 and support 13 must be plastic materials having similar dielectric properties such as cellulose organic acid esters, for example, cellulose acetate, cellulose acetate butyrate, cellulose acetate propionate, and synthetic resins, for example, polyvinyl acetate, polyvinyl chloride, copolymers of polyvinyl acetate and polyvinyl chloride, and polyvinyl acetal resins. Naturally the high-frequency system must be tuned for optimum sealing of the different materials and for different thicknesses of materials placed between the electrodes by matching the load on the electrodes and the plastic materials to the generator line. In order to get good sealing we prefer to use plastic sheets 10 and 13 of from .005 to .02 inch thick. Thicker films are difficult to handle when inserting the transparency therebetween and if thinner films are used it is difficult to tune the high-frequency sealing system and the heat from printer lamps tend to buckle and distort the masking image. We found that when using cellulose acetate for layers 10 and 13, the best thickness for sheet 10 is .0075 inch and .015 inch for support 13. The use of sheets of the preferred thickness facilitates sealing since little heat is conducted from the sealing area by the electrodes. A 210-megacycle generator operating at 115 volts and tuned to obtain maximum power may be used to supply the high-frequency field to the electrodes.

It is apparent that when sealing is effected by means of high-frequency heating as shown in Fig. 4, the apparatus may be designed to seal any number of edges in a single operation. That is, we may position the transparency between loose sheets of plastic materials one of which is sensitized and seal four edges at once or as many as three edges of the packet may have previously been sealed before insertion of the transparency in the packet. In these cases the edges may be sealed by means of heated electrodes shaped to contact one to four edges of the sheets. Such electrodes are shaped as straight bars or are L, U, or square-shaped. Naturally one or both electrodes can be movable and the means of mounting and moving the electrodes is not critical except as mentioned—metal should not be placed too close to the electrodes, particularly to the "hot" electrode. The moving means for the electrodes can be gears, hydraulic or a solenoid means. The apparatus of Fig. 4 can be used for pre-sealing the clear plastic sheet to the sensitive film along one to three edges prior to insertion of the transparency in the envelope. In this case a manual switch controlling light source 23 would be thrown to prevent exposure during the sealing operation. We are not limited to the particular means of exposing the masking emulsion layer; the only requirement is that the light source be in optical alignment with the exposure plane and preferably the apparatus includes a means for inserting light-modulting elements in the beam. However, it is desirable that the exposure and sealing steps be carried out in substantially the order described to obtain optimum quality with maximum economy. We have mentioned that the transparency for which a mask is made may be a color transparency. This transparency may be either a positive or negative relative to the original subject and the masking emulsion can be composed of one or more light-sensitive emulsion layers or a panchromatic emulsion layer. Similarly, the emulsions may contain couplers for forming colored images in the masking layer or the developer may have the couplers incorporated in it.

It is to be understood the disclosure herein is by way of example, and we consider as included in our invention all modifications and equivalents falling within the scope of the appended claims.

What we claim is:

1. The method of making a masked photographic transparency which comprises marginally sealing a photographic transparency between a transparent sheet and a photographic element carrying a light-sensitive emulsion layer on a transparent support, with said sensitive layer outermost, without separating said elements exposing said emulsion layer through said transparency and developing a masking image in said exposed layer.

2. The method of making a masked photographic transparency which comprises marginally sealing a photographic transparency between a transparent plastic sheet and a photographic element carrying a light-sensitive emulsion layer on a transparent plastic support, with said sensitive layer outermost, without separating said elements exposing said emulsion layer through said transparency and developing a masking image in said exposed layer.

3. The method of making a masked photographic transparency which comprises marginally heat-sealing a photographic transparency between a transparent plastic sheet and a photographic element carying a light-sensitive layer on a transparent plastic support, with said sensitive layer outermost, without separating said elements, exposing said sensitive layer through said transparency and developing a masking image in said exposed layer.

4. The method of making a masked photographic transparency which comprises marginally sealing by means of high-frequency heating, a photographic transparency between a transparent plastic sheet and a photographic element carrying a light-sensitive layer on a transparent plastic support having dielectric properties similar to said plastic sheet, with said sensitive layer outermost, without separating said elements, exposing said sensitive layer to an image of said transparency and developing a masking image in said exposed layer.

5. The method of making a mask for a photographic color transparency which comprises marginally sealing by means of high-frequency heating, a photographic color transparency between a transparent plastic sheet and a photographic element carrying a light-sensitive layer on a transparent plastic support having dielectric properties similar to said sheet, with said sensitive layer outermost, without separating said elements, exposing said sensitive layer to an image of said transparency and developing a masking image in said exposed layer.

6. The method of making a mask for a photographic color transparency which comprises marginally sealing by means of high-frequency heating, a photographic color transparency between a transparent plastic sheet and a photographic element carrying a light-sensitive emulsion layer on a transparent plastic support having dielectric properties similar to said plastic sheet, with said sensitive layer outermost, without separating said elements, exposing said sensitive layer to a color-separation image of said transparency and developing a color-correction mask in said exposed layer in registry with said transparency image.

7. The method of making a mask for a photographic transparency which comprises marginally cementing a photographic transparency between a transparent plastic sheet and a photographic element carrying a light-sensitive layer on a transparent plastic support, with said sensitive layer outermost, without separating said elements, exposing said sensitive layer through said transparency and developing a masking image in said exposed layer.

8. The method of making a mask for a photographic transparency which comprises marginally cementing a photographic color transparency between a transparent plastic sheet and a photographic element carrying a light-sensitive layer on a transparent plastic support, with said sensitive layer outermost, without separating said elements, exposing said sensitive layer to a color separation image of said transparency and developing a color-correction mask in said exposed layer in registry with said transparency image.

9. The method of making a mask for a photographic transparency which comprises marginally sealing a photographic transparency between a transparent plastic sheet and a photographic element carrying a light-sensitive layer on a transparent plastic support, with said sensitive layer outermost, said sealing being effected by means of pressure exerted at the edges of said sheet and said support causing them to adhere, without separating said elements, exposing said sensitive layer to an image of said transparency and developing a masking image in said exposed layer.

10. The method of printing corrected photographic images by means of a mask which comprises marginally sealing a photographic transparency between a transparent sheet and a photographic element carrying a light-sensitive layer on a transparent support, with said sensitive layer outermost, without separating said elements, exposing said sensitive layer to an image of said transparency, developing a masking image in said exposed layer, and printing a corrected image by exposure of a sensitive photographic element through the combination of said transparency and said masking image in registry and developing a corrected photographic image in said exposed photographic element.

11. The method of printing corrected photographic images by means of a mask which comprises marginally sealing a mounted photographic transparency between a transparent sheet and a photographic element carrying a light-sensitive layer on a transparent support, with said sensitive layer outermost, without separating said elements, exposing said sensitive layer to an image of said transparency, developing a masking image in said exposed layer, and printing a corrected image by exposure of a sensitive photographic element through the combination of said transparency and said masking image in registry and developing a corrected photographic image in said exposed photographic element.

12. The method of printing corrected photographic images by means of a mask which comprises marginally sealing a mounted photographic transparency between a transparent plastic sheet and a photographic element carrying a light-sensitive layer on a transparent plastic support, with said sensitive layer outermost, without separating said elements, exposing said sensitive layer to an image of said transparency, developing a masking image in said exposed layer, and printing a corrected image by exposure of a sensitive photographic element through the combination of said transparency and said masking image in registry and developing a corrected photographic image in said exposed photographic element.

13. The method of printing corrected photographic images by means of a mask which comprises marginally heat-sealing a mounted photographic transparency between a transparent plastic sheet and a photographic element carrying a light-sensitive layer on a transparent plastic support, with said sensitive layer outermost, without separating said elements, exposing said sensitive layer to an image of said transparency, developing a masking image in said exposed layer, and printing a corrected image by exposure of a sensitive photographic element through the combination of said transparency and said masking image in registry and developing a corrected photographic image in said exposed photographic element.

JOHN W. GOSLING.
CHARLES S. COMBS.

REFERENCES CITED

The following references are of record in the file of this patent:

UNITED STATES PATENTS

| Number | Name | Date |
|---|---|---|
| 762,816 | Fritsche | June 14, 1904 |
| 1,499,230 | Lage | June 24, 1924 |
| 2,266,435 | Nadeau et al. | Dec. 16, 1941 |
| 2,299,990 | Jones | Oct. 27, 1942 |
| 2,336,663 | Wolters et al. | Dec. 14, 1943 |
| 2,338,878 | Stead | Jan. 11, 1944 |
| 2,363,689 | Rackett | Nov. 28, 1944 |
| 2,367,551 | Yule | Jan. 16, 1945 |
| 2,400,366 | Murray | May 14, 1946 |
| 2,407,211 | Yule | Sept. 3, 1946 |
| 2,409,976 | Dean | Oct. 22, 1946 |
| 2,420,636 | Yule | May 13, 1947 |